United States Patent [19]

Maekawa

[11] Patent Number: 5,751,722
[45] Date of Patent: May 12, 1998

[54] METHOD OF DISPLAYING A FROZEN IMAGE WHEN TRANSMISSION OF IMAGE INFORMATION IS SUSPENDED IN A MULTIMEDIA SYSTEM

[75] Inventor: Yoshito Maekawa, Yokohama, Japan

[73] Assignee: Canon Kabushiki Kaisha, Tokyo, Japan

[21] Appl. No.: 14,818

[22] Filed: Feb. 8, 1993

[30] Foreign Application Priority Data

| Feb. 10, 1992 | [JP] | Japan | 4-057544 |
| May 6, 1992 | [JP] | Japan | 4-141012 |

[51] Int. Cl.$^6$ ............................................. H04J 3/12
[52] U.S. Cl. ............................. 370/522; 370/468; 348/14; 379/202
[58] Field of Search .......................... 370/110.1, 62, 370/84, 16, 259, 522, 232, 217, 221, 225; 379/53, 202, 389; 358/22, 181, 183; 348/14, 584, 616, 578, 15, 16

[56] References Cited

U.S. PATENT DOCUMENTS

| 4,825,206 | 4/1989 | Brice, Jr. et al. | 370/16 |
| 4,953,196 | 8/1990 | Ishikawa et al. | 379/53 |
| 4,962,521 | 10/1990 | Komatsu et al. | 379/53 |
| 5,063,440 | 11/1991 | Hong | 379/53 |
| 5,230,015 | 7/1993 | Yokodate et al. | 379/53 |
| 5,272,527 | 12/1993 | Watanabe | 379/53 |
| 5,301,191 | 4/1994 | Otani | 370/84 |
| 5,343,240 | 8/1994 | Yu | 348/14 |
| 5,414,457 | 5/1995 | Kadowaki et al. | 348/14 |
| 5,418,560 | 5/1995 | Yasuda | 348/14 |

*Primary Examiner*—Douglas W. Olms
*Assistant Examiner*—Shick Hom
*Attorney, Agent, or Firm*—Morgan & Finnegan LLP

[57] ABSTRACT

A multimedia communication apparatus or system is able to display an undisturbed image if image transmission is suspended during audio visual (AV) communication. If the hold-key of the operational unit of an apparatus is pressed during multimedia communication, the system control unit suspends audio and image signals for transmission, and transmits a suspension command to a communication-partner apparatus. When the communication-partner apparatus receives the suspension command, the video interface thereof freezes an image currently received, and the image memory stores this frozen image. Then, the video interface shifts its output to the display from the images received from the video coder-decoder to the frozen image stored in the image memory. The display thus displays the frozen image during the communication suspension. Further, if image transmission is suspended, a transmission capacity including a capacity for image information is used to transmit information regarding the suspension.

7 Claims, 20 Drawing Sheets

METHOD OF DISPLAYING A FROZEN IMAGE WHEN TRANSMISSION OF IMAGE INFORMATION IS SUSPENDED IN A MULTIMEDIA SYSTEM

BACKGROUND OF THE INVENTION

1. Field of the Invention

The present invention relates to a multimedia communication apparatus using a variety of media, such as images, sounds and data, and a system employing the multimedia communication apparatus.

2. Description of the Related Art

Since the ISDN (Integrated Service Digital Network) became available, a great deal of attention has been drawn to AV (audio visual) communication services using digital lines represented by the ISDN. Now, an increasing number of multimedia communication apparatuses, such as TV telephone apparatuses and TV meeting systems, have been put into use.

The CCITT (Consultive Committee of International Telegraph and Telephone) recommends, for example, in H. 320, H. 242 and H. 221, standards for the services, protocols and multimedia multiple frame structures for AV communication services.

The CCITT also recommends a multimedia communication method which performs multimedia (e.g., image, sound and data) communication by using a D channel to set an end-to-end connection, using FAS (frame alignment signal) in a B channel for synchronization, and employing procedures using BAS (bit-rate allocation signal) on the B channel, for example, a procedure sequence for exchanging terminal abilities and a procedure sequence for selecting a communication mode.

The transmission speeds in the media used for multimedia communication are determined as follows. The audio transmission speed is determined by a sound coding method selected. The data transmission speed is designated if there is any data to be transmitted. Then, the image transmission speed is automatically determined by subtracting the audio transmission speed and the data transmission speed (if there is any data) from the transmission speed of the entire communication path. Therefore, the information regarding transmission speeds which an apparatus needs to send when sending a selected communication mode to a partner apparatus (a receiver) by using BAS is only the information about a selected sound coding method and a designated data transmission speed. The image transmission speed is automatically set in the communication system including the apparatuses of the sender and the receiver.

In general, a multimedia communication apparatus is able to suspension AV communication. Like an ordinary telephone, when a hold key is pressed during AV communication, audio transmission is suspended, and during this suspension, sounds indicating the suspension are sent to a partner apparatus through the audio channel.

A known multimedia communication apparatus employs procedures for selecting a communication mode including a procedure for sending video-on and video-off signals belonging to BAS commands. Therefore, such an apparatus can select whether or not to transmit an image, for example, during a hold (while communication is suspended). Normally, such a multimedia communication apparatus stops normal display of images when receiving a video-off signal.

Known multimedia communication apparatus in general suspend audio transmission but are not able to suspend image transmission. Therefore, a suspension of communication by such a known apparatus results in a situation where images are transmitted from the apparatus to a partner apparatus and displayed without any sounds. This situation is particularly awkward in a TV telephone system or a TV meeting system.

As described above, there are some communication systems in which the apparatuses are able to suspend image transmission as well as audio transmission. However, even in such a system, when an apparatus suspends communication with a partner apparatus, the partner apparatus displays no image or displays a disturbed image, which situation is also far from desirable.

SUMMARY OF THE INVENTION

Accordingly, an object of the present invention is to provide a multimedia communication apparatus and a system employing the same in which both audio transmission and image transmission can be suspended and, even when a multimedia communication apparatus suspends image transmission to a partner apparatus, the partner apparatus displays an image which is not disturbed.

To achieve the above object, an aspect of the present invention provides a multimedia communication apparatus and a system employing the same in which when a first multimedia communication apparatus receives a communication suspension signal during communication with a second multimedia communication apparatus, the first multimedia communication apparatus suspends both audio transmission and image transmission to the second multimedia communication apparatus, and the second multimedia communication apparatus displays a paused image or an image indicating communication suspension.

Thus, this aspect of the present invention eliminates the above-described problems of the known art in which image transmission cannot be suspended and in which when an apparatus suspends image transmission to a partner apparatus during AV communication therebetween, the partner apparatus displays no image or a disturbed image.

Further, according to the known art, when a multimedia communication apparatus suspends image transmission to a partner apparatus, the transmission capacity allocated for image transmission is left unused. This unused transmission capacity should be utilized.

Accordingly, another object of the present invention is to provide a multimedia communication apparatus and a system employing the same which can utilize a transmission capacity allocated for image transmission during an image transmission suspension.

To achieve the above object, another aspect of the present invention provides a multimedia communication apparatus and a system employing the same in which when a first multimedia communication apparatus suspends image transmission to a second multimedia communication apparatus, the first multimedia communication apparatus uses a transmission capacity allocated for image transmission in order to transmit sounds indicating suspension or a suspension message, and the second multimedia communication apparatus produce the sounds or displays the suspension message.

Thus, a multimedia communication apparatus and a system employing the same according to this aspect of the present invention can utilize a transmission capacity allocated for image transmission during an image transmission suspension.

Further objects, features and advantages of the present invention will become apparent from the following descrip-

DESCRIPTION OF THE PREFERRED EMBODIMENTS

The preferred embodiments of the present invention will be described hereinafter with reference to the drawings.

Figure 1:
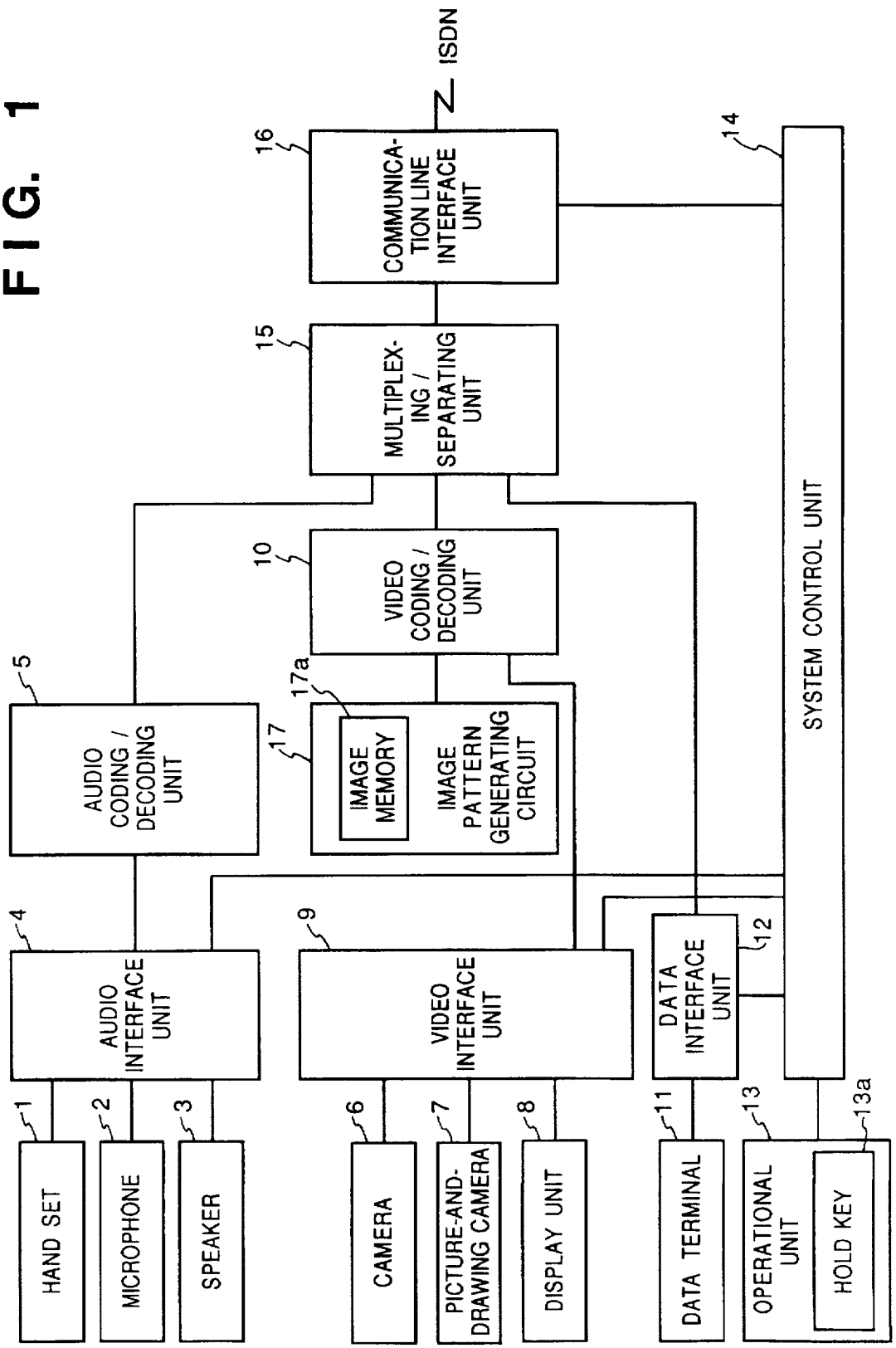
FIG. 1 is a schematic block diagram of a multimedia communication apparatus according to a first embodiment of the present invention.

FIG. 1 is a schematic block diagram of a multimedia communication apparatus according to the first embodiment of the present invention. The apparatus according to this embodiment has sound output/input means including a handset 1, microphone 2 and a speaker 3. A audio interface 4 is connected to the sound output/input means and controlled by a system control unit 14 so as to perform a variety of functions, for example: connection selection to select the handset 1, the microphone 2 or the speaker 3; on/off-hook detection to detect whether the state of the handset 1 is on-hook or off-hook; echo cancellation to suppress echoes occurring when the microphone 2 and the speaker 3 are used; tone generation to generate various tones such as dial or touch tones, a calling tone, a busy tone and an incoming tone. Further, when a hold key 13a is pressed, the audio interface 4 suspends sound input and sends a sound indicating suspension (referred to as "a suspension sound") to a communication-partner apparatus, under the control of the system control unit 14.

A audio coding/decoding unit 5 is connected to the audio interface unit 4. Under the control of the system control unit 14, the audio coding/decoding unit 5 codes sound signals for transmission and decodes incoming sound signals in accordance with sound-signal coding and decoding algorithms such as 64 kbps PCM A-law, 64 kbps PCM μ-law, 64 kbps/56 kbps/48 kbps SB-ADPCM, 32 kbps ADPCM, 16 kbps (e.g., APC-AB), or 8 kbps.

This multimedia communication apparatus has image input/output means including: a camera 6 for inputting mainly the images of a user; a picture-and-drawing camera 7 for inputting images of pictures, drawings, etc.; and a display unit 8 for displaying images inputted by the cameras 6 and 7, images from a communication-partner apparatus and images for operational assistance for a user. The image input/output means are connected to a video interface unit 9. The video interface unit 9 is controlled by the system control unit 14 so as to perform a variety of functions, for example: input selection to select the camera 6 or the camera 7 for input; display selection to select the types of images, that is, the above-mentioned input images, received images (images received from a communication-partner apparatus) or operation-assisting images, for display; image signal integration to display different types of images (if more than one type are selected) in divided portions of a frame. Further, when AV communication is suspended, the video interface unit 9 freezes input images or received images and switches the display image to a frozen image or an image indicating the suspension (referred to as "a suspension image").

An image pattern generating circuit 17 is connected to the video interface unit 9. This circuit generates an image pattern to be displayed during a suspension of AV communication, and has an image memory 17a for storing a frozen image or a suspension image recorded or generated beforehand. The image pattern generating circuit 17 is connected to a video coding/decoding unit 10. This unit codes images to transmit and decodes images received from a communication-partner apparatus, in accordance with CCITT recommendation H. 261.

A data terminal 11 is used for communication of data such as code data. The data terminal 11 is connected to a data interface unit 12. The data interface unit 12 sends transmitting data from the data terminal 11 and the system control unit 14 to a multiplexing/separating unit 15, and sends received data from the multiplexing/separating unit 15 to the data terminal 11 and the system control unit 14.

An operational unit 13 is used as input means for inputting data necessary to perform the overall control of this apparatus. This unit has the above-mentioned hold key 13a, which is used to suspend AV communication, particularly, image communication. The operational unit 13 is provided in the form of a keyboard, a touch panel or the like.

The system control unit 14 comprises a CPU (central processing unit), a ROM (read only memory), a RAM (random access memory) and an auxiliary memory, and thus monitors and controls the above-described units of this apparatus. Particularly, it calculates the image transmission speed by using the above-mentioned inputted control information regarding the conditions of the communication line, etc. Further, it generates an operation-assisting display image and executes an application program, in accordance with a determined communication mode, the accordingly selected control method and the state of the communication apparatus and communication.

In accordance with CCITT recommendation H. 221, the multiplexing/separating unit 15 multiplexes in the units of transmission frame the following signals and data: coded transmission audio signals received from the audio coding/decoding unit 5; coded transmission image signals received from the video coding/decoding unit 10; data received from the data interface unit 12; data received from the system control unit 14; and control data as described in CCITT recommendation H. 221, H. 242, etc., received from the system control unit 14. Further, the multiplexing/separating unit 15 separates a received frame (a frame received from a communication-partner apparatus) into the above-mentioned components also in accordance with CCITT recommendation H. 221, H. 242, etc., and sends them to the respective units, that is, the audio coding/decoding unit 5, video coding/decoding unit 10 and the data interface unit 12. A communication line interface 16 receives commands from and sends commands to the system control unit 14, and accordingly controls an ISDN line in accordance with an ISDN user network interface.

Figure 2:
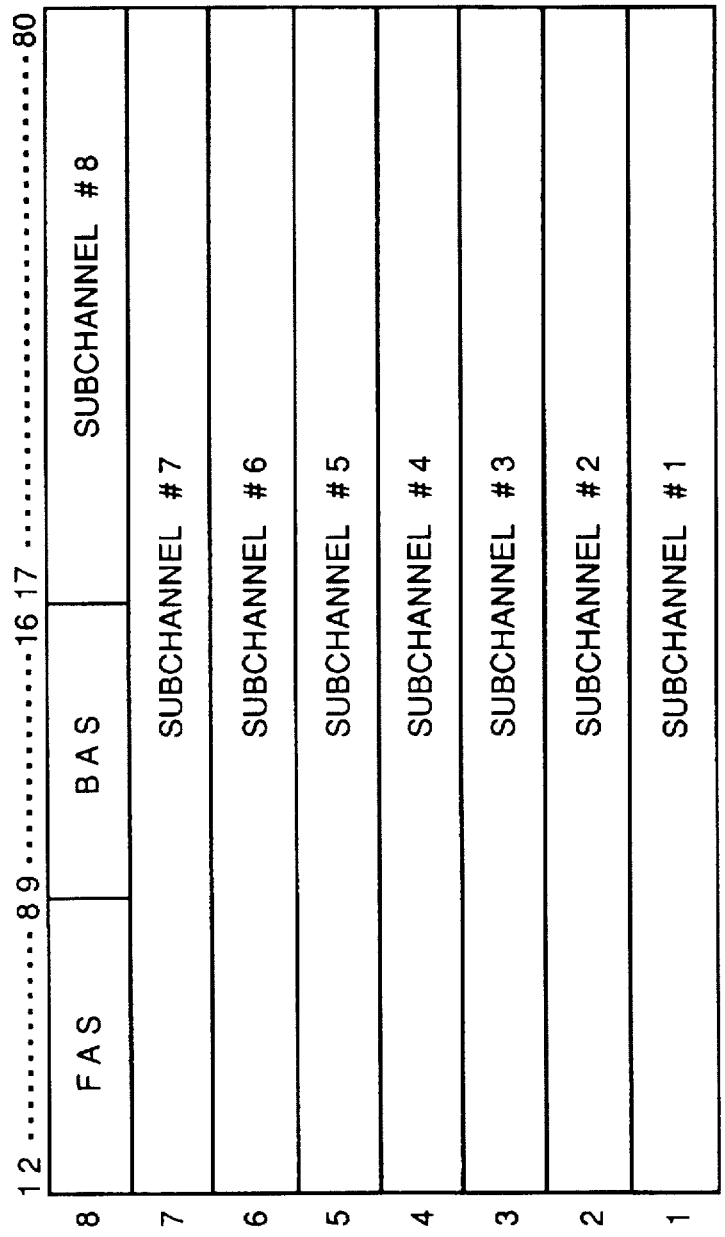
FIG. 2 illustrates the frame structure of the 6.4 kbps channel defined in CCITT recommendation H. 221.

FIG. 2 illustrates the frame structure in 64 kbps defined in CCITT recommendation H. 221. As shown in the figure, this frame has eight subchannels. The eighth channel carries frame alignment signal (FAS) and bit-rate allocation signal (BAS). A BAS is used as a suspension command to suspend communication.

Figure 3:
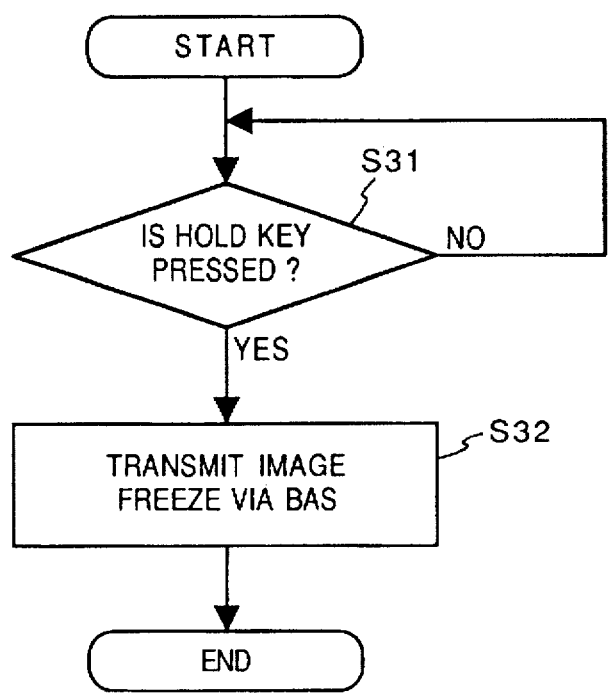
FIG. 3 is the flowchart of the suspension-signal transmission of the multimedia communication apparatus shown in FIG. 1.

With reference to FIG. 3, an operation to suspend multimedia communication performed by a multimedia communication apparatus according to this embodiment will be described. In Step S31, the system control unit 14 monitors whether the hold key 13a of the operational unit 13 has been pressed during multimedia communication. The system control unit 14 repeats this monitoring step (S31) until the unit 14 observes that the hold key 13a has been pressed. If the hold key 13a has been pressed, the operation proceeds to Step S32. In Step S32, in order to notify this suspension to a communication-partner apparatus, the audio interface unit 4 suspends transmission of sounds and outputs a suspension sound (indicating the suspension), and the video coding/decoding unit 10 sets the bit rate allocation signal (BAS) in the frame as shown in FIG. 2 to a freeze command (01010000) and transmits the freeze command (a BAS command) to the communication-partner apparatus through the communication line interface unit 16.

Figure 4:
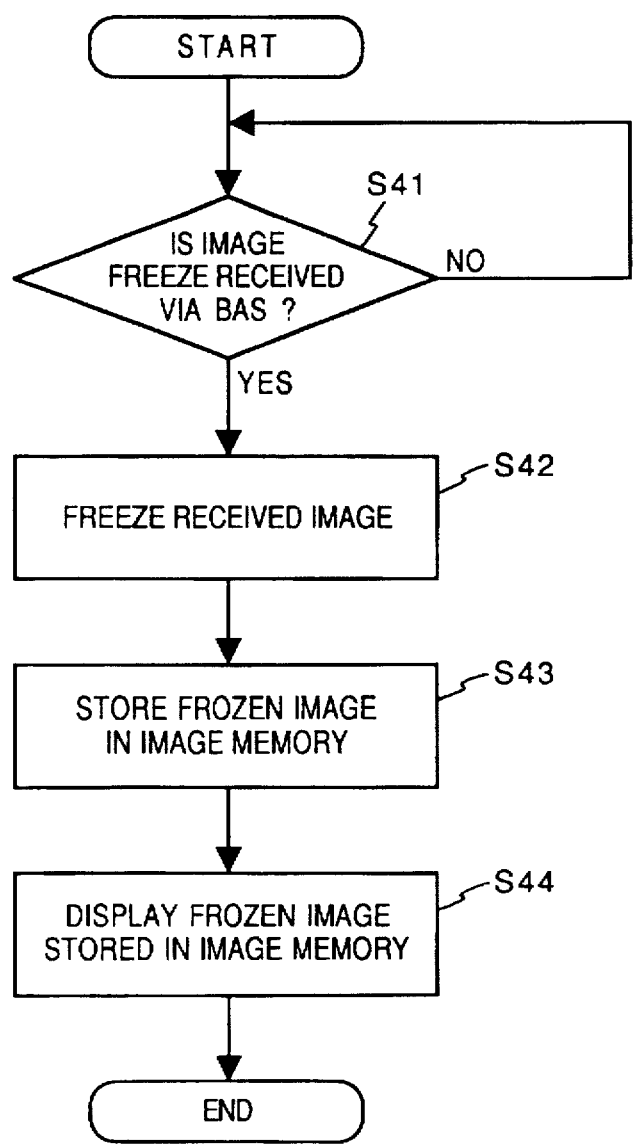
FIG. 4 is the flowchart of the suspension-signal reception of the multimedia communication apparatus shown in FIG. 1.

With reference to FIG. 4, an operation related to reception of a freeze command (a suspension signal) will be described.

In Step S41, the system control unit 4 monitors whether or not a bit rate allocation signal (BAS) decoded by the video coding/decoding unit 10 is a freeze command (01010000). The system control unit 14 repeats this monitoring step until it detects a freeze command in the BAS. If a freeze command is detected, the operation proceeds to Step S42, where the system control unit 14 commands the video interface unit 9 to freeze an image currently received. In Step S43, the frozen image is stored in the image memory 17a. In Step S44, the video interface unit 9 shifts its output to the display unit 8 from image signals decoded by the video coding/decoding unit 10 to the frozen image stored in the image memory 17a, and thus the display unit 8 displays the frozen image.

Therefore, in a system employing multimedia communication apparatuses according to this embodiment, because an apparatus sends a suspension signal to a communication-partner apparatus, and because the communication-partner apparatus which has received the suspension signal freezes an image and displays the frozen image, the partner apparatus is able to suspend both sound production and image display and to display an undisturbed image. Otherwise, the partner apparatus would display no image or display a disturbed image.

Figure 5:
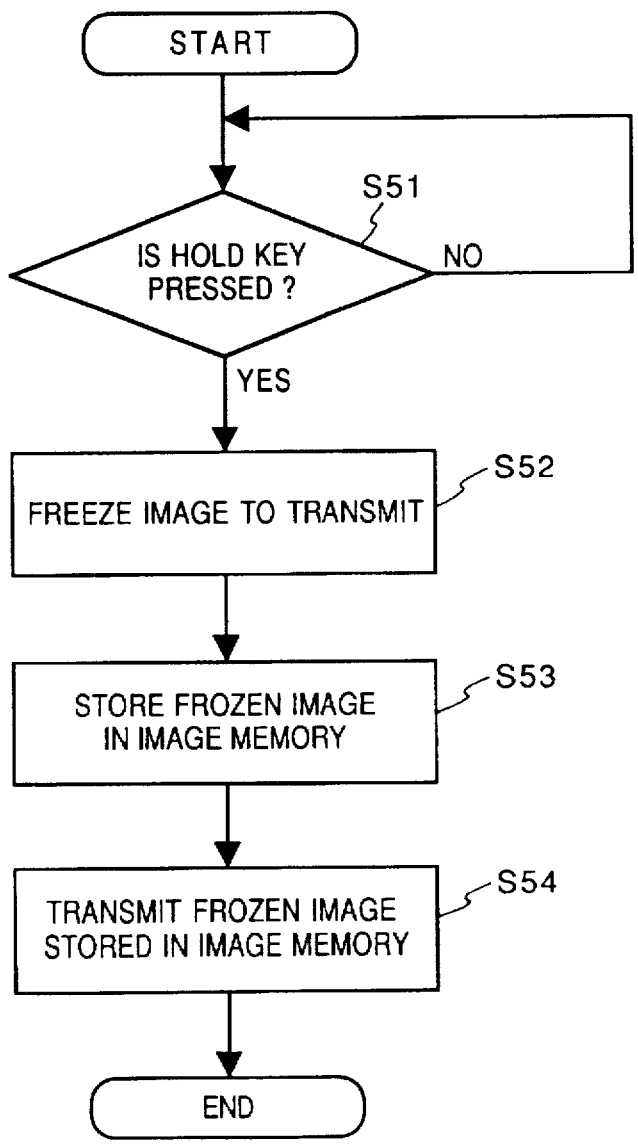
FIG. 5 is the flowchart of the suspension-signal transmission of a multimedia communication apparatus according to a second embodiment of the present invention.

With reference to FIG. 5, an operation to suspend multimedia communication performed by a multimedia communication apparatus according to a second embodiment will be described. In Step S51, the system control unit 14 monitors whether the hold key 13a of the operational unit 13 has been pressed during multimedia communication. This step is repeated until the hold key 13a is pressed. If the hold key 13a has been pressed, the operation proceeds to Step S52, where the system control unit 14 commands the audio interface unit 4 to suspend audio transmission and the video interface unit 9 to freeze an image to be currently transmitted. In Step S53, the frozen image is stored in the image memory 17a. In Step S54, the video interface unit 9 shifts its output to the video coding/decoding unit 10 from the images inputted by the camera 6 and/or the picture-and-drawing camera 7 to the frozen image stored in the image memory 17a, and thus the video coding/decoding unit 10 outputs signals of the frozen image to transmit to a communication-partner apparatus.

According to the second embodiment, because a multimedia communication apparatus transmits a frozen image to a communication-partner apparatus when suspending communication, the partner apparatus is able to suspend both sound production and image display and to display an undisturbed image. Otherwise, the partner apparatus would display no image or display a disturbed image.

Figure 6:
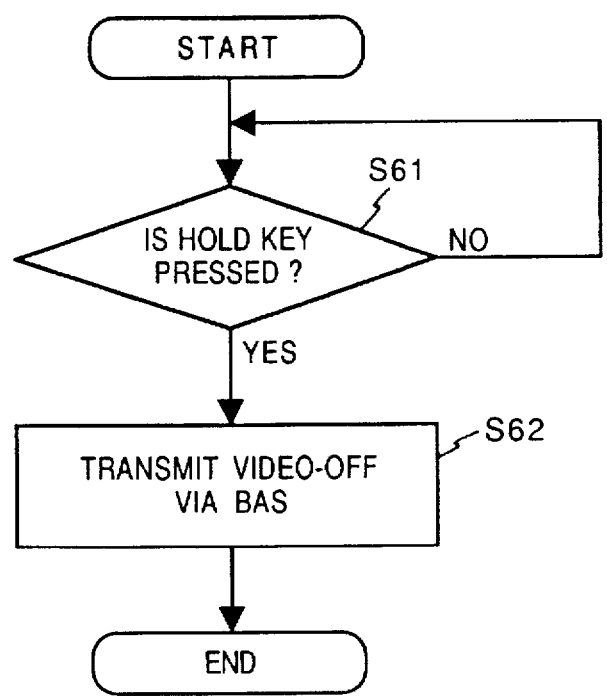
FIG. 6 is the flowchart of the suspension-signal transmission of a multimedia communication apparatus according to a third embodiment of the present invention.

With reference to FIG. 6, an operation to suspend multimedia communication performed by a multimedia communication apparatus according to a third embodiment will be described. In Step S61, the system control unit 14 monitors whether the hold key 13a of the operational unit 13 has been pressed during multimedia communication. This monitoring step (S61) is repeated until it is observed that the hold key 13a has been pressed. If the hold key 13a has been pressed, the operation proceeds to Step S62. In S62, the audio interface unit 4 suspends audio transmission, and the video coding/decoding unit 10 sets the bit rate allocation signal (BAS) in the frame as shown in FIG. 2 to a video-off command (01000000) and transmits the video-off command (a BAS command) to the communication-partner apparatus through the communication line interface unit 16.

Figure 7:
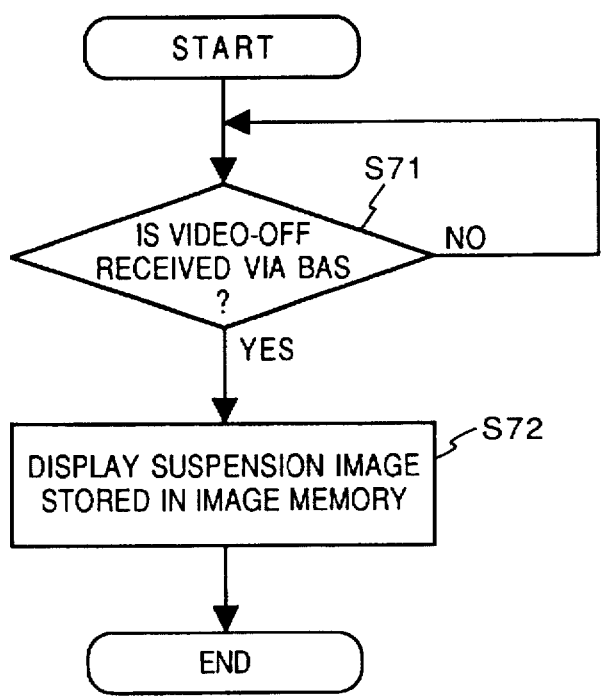
FIG. 7 is the flowchart of the suspension-signal reception of the multimedia communication apparatus according to the third embodiment of the present invention.

With reference to FIG. 7, an operation related to reception of a freeze command (a suspension signal) performed according to the above embodiment will be described. In Step S71, the system control unit 4 monitors whether or not a bit rate allocation signal (BAS) decoded by the video coding/decoding unit 10 is a video-off command (01000000). This monitoring step is repeated until a video-off command is detected in the BAS. If a video-off command is detected, the operation proceeds to Step S72. In Step S72, the video interface unit 9 shifts its output to the display unit 8 from image signals decoded by the video coding/decoding unit 10 to a suspension image generated or recorded beforehand by the image pattern generating circuit 17, and thus the display unit 8 displays the suspension image.

Therefore, in a system employing multimedia communication apparatuses according to the third embodiment, because an apparatus sends a suspension signal to a communication-partner apparatus, and because when receiving the suspension signal, the partner apparatus displays a suspension image generated or recorded beforehand, the partner apparatus is able to suspend both sound production and image display and to display an undisturbed image. Otherwise, the partner apparatus would display no image or display a disturbed image.

Figure 8:
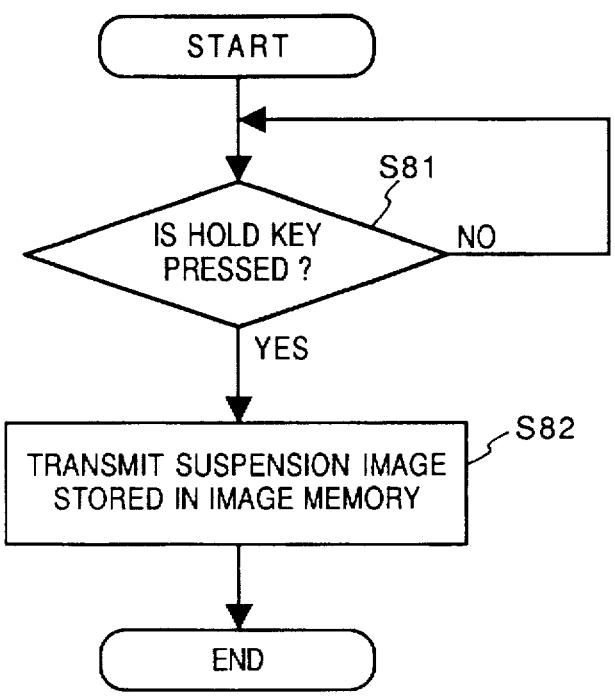
FIG. 8 is the flowchart of the suspension-signal transmission of a multimedia communication apparatus according to a fourth embodiment of the present invention.

With reference to FIG. 8, an operation to suspend multimedia communication performed according to a fourth embodiment will be described. In Step S81, the system control unit 14 monitors whether the hold key 13a of the operational unit 13 has been pressed during multimedia communication. This step is repeated until the hold key 13a is pressed. If the hold key 13a has been pressed, the operation proceeds to Step S82. In Step S82, the video interface unit 9 shifts its output to the video coding/decoding unit 10 from the images inputted by the camera 6 and/or the picture-and-drawing camera 7 to a suspension image generated or recorded beforehand by the image pattern generating circuit 17, and thus the video coding/decoding unit 10 outputs signals of the suspension image for transmission to a communication-partner apparatus.

According to this embodiment, because a multimedia communication apparatus transmits a suspension image generated or recorded beforehand to a communication-partner apparatus when suspending communication, the partner apparatus is able to suspend both sound production and image display and to display an undisturbed image. Otherwise, the partner apparatus would display no image or display a disturbed image.

According to the above-described embodiments of the present invention, a multimedia communication apparatus is able to suspend both audio communication and image communication during multimedia communication, and when an apparatus transmits a suspension signal to a communication-partner apparatus, the partner apparatus is able to display an undisturbed image (otherwise, it would display no image or a disturbed image), because:

(1) An apparatus transmits a suspension signal to a communication-partner apparatus, and the communication-partner apparatus freezes an image currently received and displays the frozen image in response to the suspension signal.

(2) An apparatus freezes an image to be currently transmitted and transmits the frozen image along with a suspension signal to a communication-partner apparatus.

(3) An apparatus transmits a suspension signal to a communication-partner apparatus, and the communication-partner apparatus displays a suspension image generated or recorded beforehand, in response to the suspension signal.

(4) An apparatus transmits a suspension image generated or recorded beforehand, along with a suspension signal, to a communication-partner apparatus.

Figure 9:
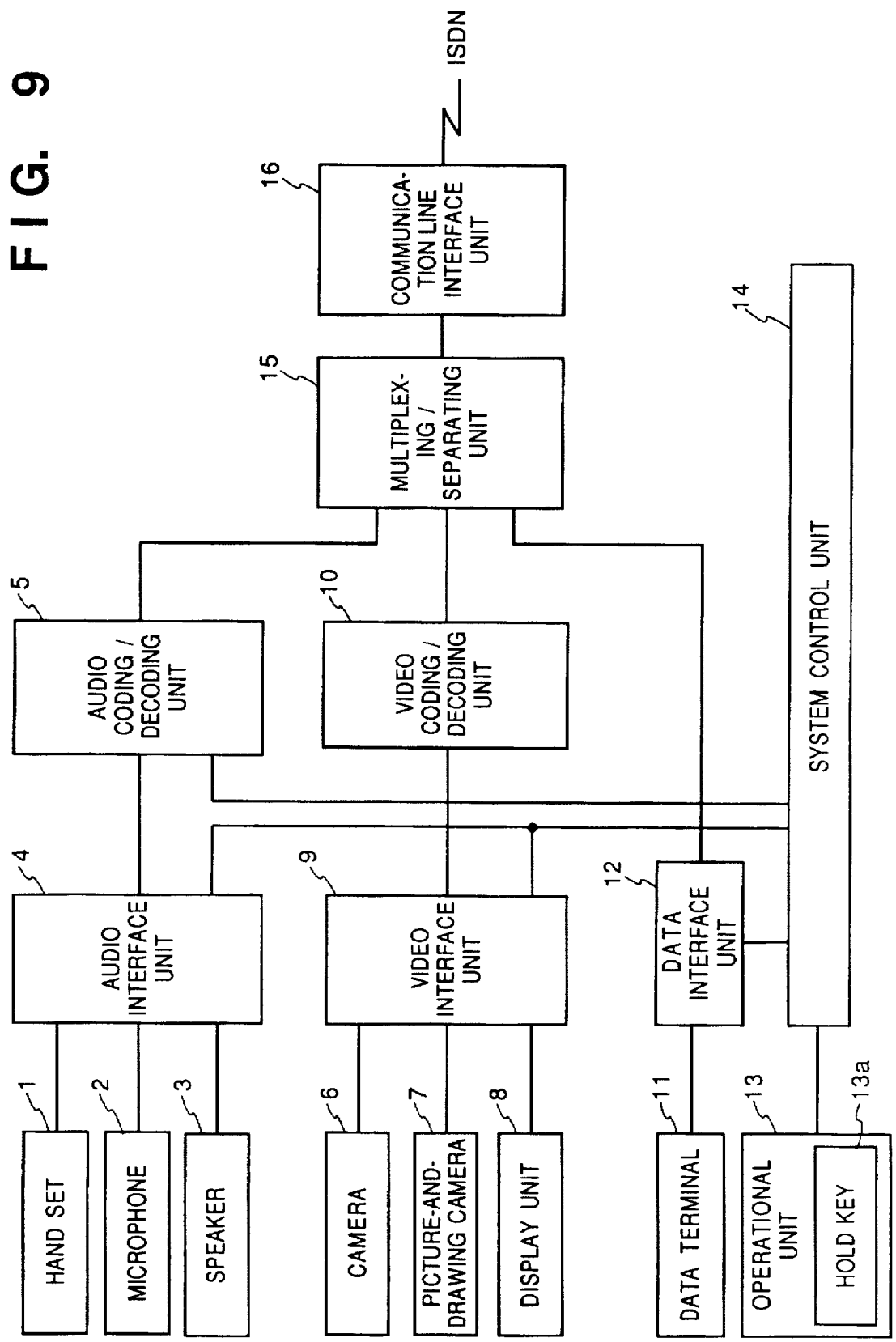
FIG. 9 is a schematic block diagram of a multimedia communication apparatus according to a fifth embodiment of the present invention.

A multimedia communication apparatus according to a fifth embodiment of the present invention with reference to FIG. 9.

As shown in FIG. 9, a hand set for inputting and outputting sounds, a microphone 2 for inputting sounds (mainly user's voices) and a speaker 3 for outputting sounds are connected to a audio interface unit 4. The audio interface unit 4 is controlled by a system control unit 14 (which will be described later) so as to perform a variety of functions, for example: connection selection to select the handset 1, the microphone 2 or the speaker 3; on/off-hook detection to detect whether the state of the handset 1 is on-hook or off-hook; echo cancellation to suppress echoes occurring when the microphone 2 and the speaker 3 are used; tone generation to generate various tones such as dial or touch tones, a calling tone, a busy tone, an incoming tone and a tone indicating a suspension (a suspension tone). An audio coding/decoding unit 5 is connected to the audio interface unit 4. Under the control of the system control unit 14, the audio coding/decoding unit 5 codes sound signals for transmission and decodes incoming sound signals in accordance with sound-signal coding and decoding algorithms such as 64 kbps PCM A-law, 64 kbps PCM μ-law, 64 kbps/56 kbps/48 kbps SB-ADPCM, 32 kbps SB-ADPCM, 16 kbps (e.g., APC-AB), or 8 kbps (APC-AB).

FIG. 9 further shows: camera 6 for inputting mainly the images of a user; a picture-and-drawing camera 7 for inputting images of pictures, drawings, etc.; and a display unit 8 for displaying images inputted by the cameras 6 and 7, images from a communication-partner apparatus and images for operational assistance for a user. The cameras 6 and 7 and the display unit 8 are connected to a video interface unit 9. The video interface unit 9 is controlled by the system control unit 14 so as to perform a variety of functions, for example: input selection to select the camera 6 or the camera 7 for input; display selection to select the types of images, that is, the above-mentioned input images, received images (images received from a communication-partner apparatus) or operation-assisting images, for display; image signal integration to display different types of images in divided portions of a frame.

The video interface unit 9 is connected to a video coding/decoding unit 10. This unit codes images to transmit and decodes images received from a communication-partner apparatus, in accordance with CCITT recommendation H. 261.

A data terminal 11 is used for communication of data. The data terminal 11 is connected to a data interface unit 12. The data interface unit 12 sends transmitting data received from the data terminal 11 and the system control unit 14 to a multiplexing/separating unit 15, and sends received data to the data terminal 11 and the system control unit 14.

An operational unit 13 is used to input data necessary to perform the overall control of this apparatus. This unit has a hold key 13a, which is used to suspend AV communication, particularly, image communication and transmit a suspension sound. The operational unit 13 is provided in the form of a keyboard, a touch panel or the like.

The audio interface unit 4, the video interface unit 5, the data interface 12, the audio coding/decoding unit 5 and the operational unit 13 are connected to the system control unit 14. The system control unit 14 comprises a CPU, a ROM, a RAM an auxiliary memory or the like. The system control unit 14 monitors performs various functions, for example: monitoring of the operations of the above-described units, control of the apparatus, operations in accordance with the conditions of the apparatus and multimedia communication, generation of display images and execution of application programs.

The audio coding/decoding unit 5, the video coding/decoding unit 10 and the data interface unit 12 are connected to a multiplexing/separating unit 5. In accordance with CCITT recommendation H. 221, the multiplexing/separating unit 15 multiplexes in the units of transmission frame the following signals and data: coded transmission audio signals received from the audio coding/decoding unit 5; coded transmission image signals received from the video coding/decoding unit 10; data received from the data interface unit 12; data from received the system control unit 14; and control data, for example, FAS and BAS, described in CCITT recommendation H. 221, H. 242, etc., received from the system control unit 14. Further, the multiplexing/separating unit 15 separates a received frame (a frame received from a communication-partner apparatus) into the above-mentioned components, that is, audio signals, image signals and data signals, also in accordance with CCITT recommendation H. 221, H. 242, etc. and sends them to the respective units. The multiplexing/separating unit 15 is connected to an ISDN line through a communication line interface 16. The communication line interface 16 controls the ISDN line in accordance with an ISDN user network interface.

Figure 10:
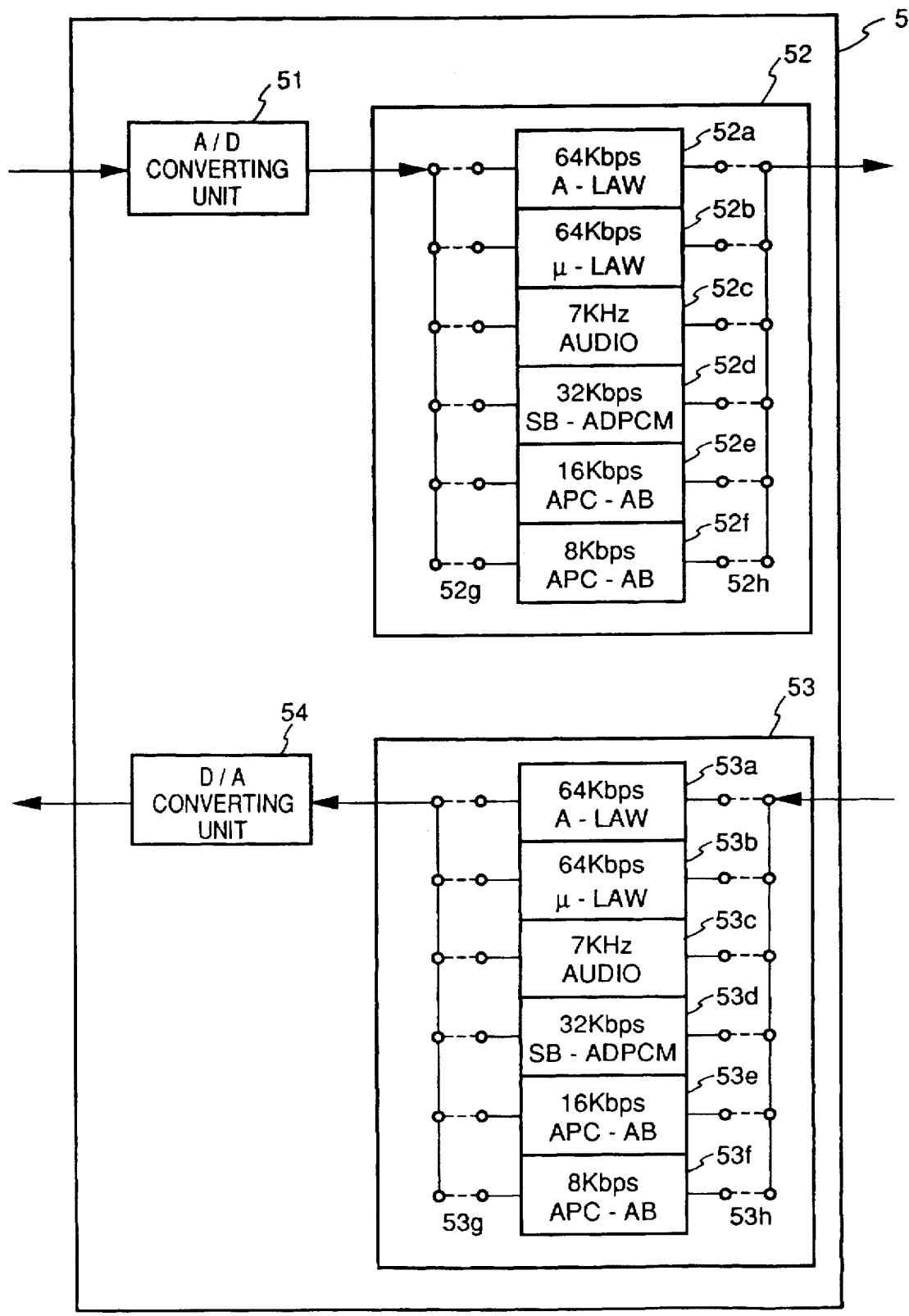
FIG. 10 is a block diagram of the sound coding and decoding unit of the multimedia communication apparatus shown in FIG. 9.

FIG. 10 is a block diagram of the audio coding/decoding unit 5. The audio coding/decoding unit 5 comprises: an A/D converting portion 51 for A/D-converting audio signals inputted from the audio interface unit 4; a coding portion 52 for coding A/D-converted audio data by a coding mode designated by the system control unit 14; a decoding portion 53 for decoding coded audio data received from the multiplexing/separating unit 15 by a decoding mode designated by the system control unit 14; and a D/A converting portion 54 for D/A-converting decoded audio data.

The coding portion 52 comprises codecs for coding in accordance with various coding modes: a 64 kbps PCM A-Law coding codec 52a; a 64 kbps PCM μ-Law coding codec 52b; 64 kbps/56 kbps/48 kbps SB-ADPCM (7 KHz audio) coding codec 52c; 32 kbps SB-ADPCM coding codec 52d; 16 kbps APC-AB coding codec 52e; and an 8 kbps APC-AB coding codec 52f. The coding portion 52 further comprises switches 52g and 52h for selecting one of the above codecs in accordance with a mode designated by the system control unit 14.

The coding portion 53 comprises codecs for coding in accordance with various coding modes: a 64 kbps PCM A-Law coding codec 53a; a 64 kbps PCM μ-Law coding codec 53b; 64 kbps/56 kbps/48 kbps SB-ADPCM (7 KHz audio) coding codec 53c; 32 kbps SB-ADPCM coding codec 53d; 16 kbps APC-AB coding codec 53e; and an 8 kbps APC-AB coding codec 53f. The coding portion 53 further comprises switches 53g and 53h for selecting one of the above codecs in accordance with a mode designated by the system control unit 14.

Figure 11:
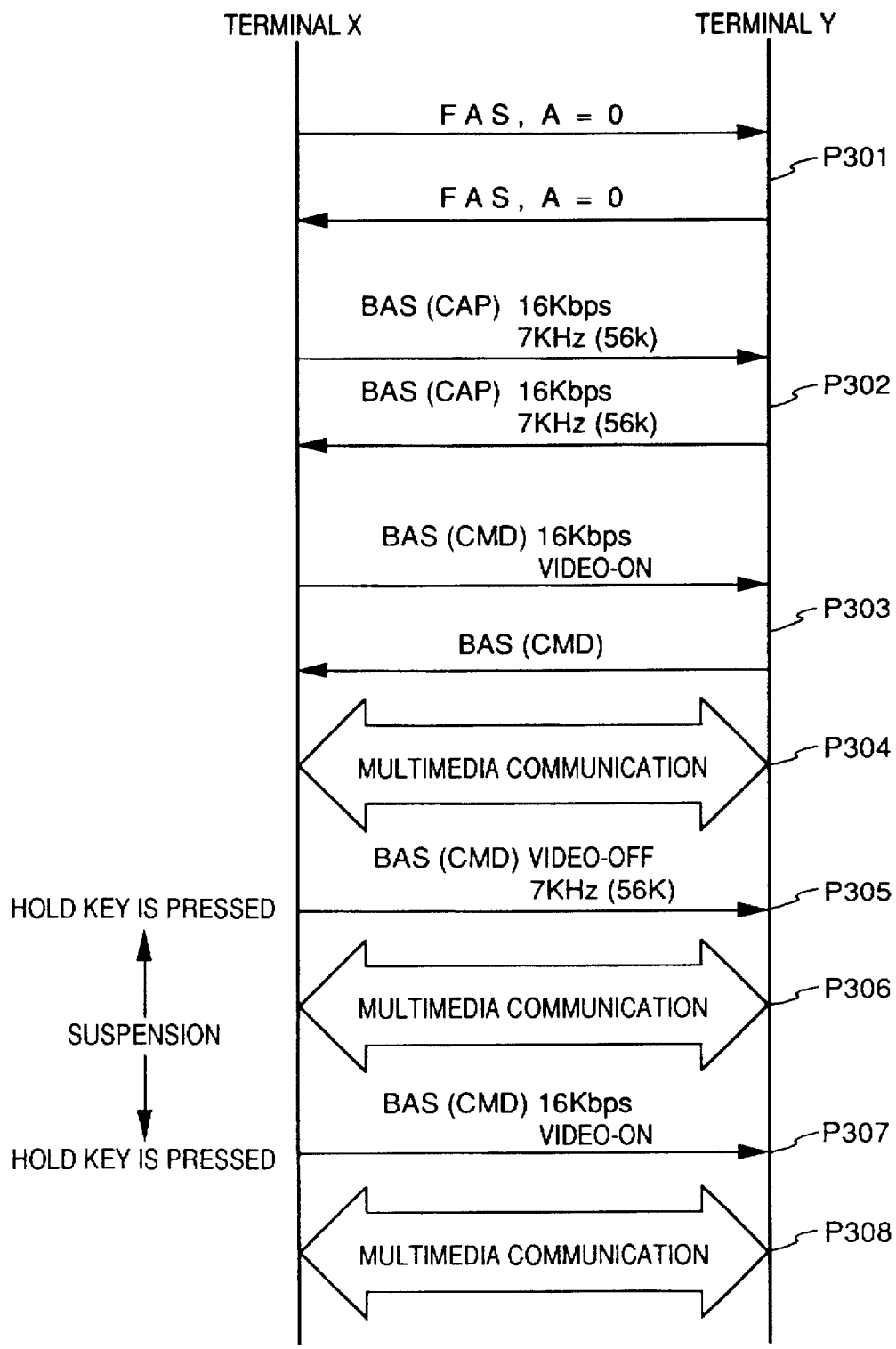
FIG. 11 is the procedure of multimedia communication performed by the multimedia communication apparatus according to the fifth embodiment of the present invention.

FIG. 11 illustrates the procedure sequence on a B channel during multimedia communication. After an end-to-end connection is determined using a D channel, H. 221 frame synchronization is performed using FAS (P301). After frame synchronization (P301), H. 242 ability exchange is preformed using ability BAS codes (P302), which exchanges, for example: audio abilities, such as 7 KHz audio (56 kbps), except for both A-Law audio and μ-Law audio; transmission rate abilities such as 1B channel; video abilities; and data abilities. After ability exchange (P302), H. 242 mode shift is performed using BAS commands (P303) in order to select a communication mode within the range of ability enabling communication. Further, the system control unit 14 selects an audio coding mode on the basis of the transmission speed of an available communication path. For example, if 16 kbps audio and 46.4 kbps video are used for 64 kbps B channel communication, mode shifts, such as shifts to the 16 kbps audio and to the video-on, are designated in the H. 242 mode shift process P303. Further, at a terminal X (a first multimedia communication apparatus), the switches 52g and 52h in the coding portion 52 are shifted to select the 16 kbps APC-AB codec 52e. At a terminal Y (a second multimedia communication apparatus), the switches 53g and 53h in the decoding unit 53 are shifted to the 16 kbps APC-AB codec 53e. Then, multimedia communication is performed (P304).

Figure 12A:
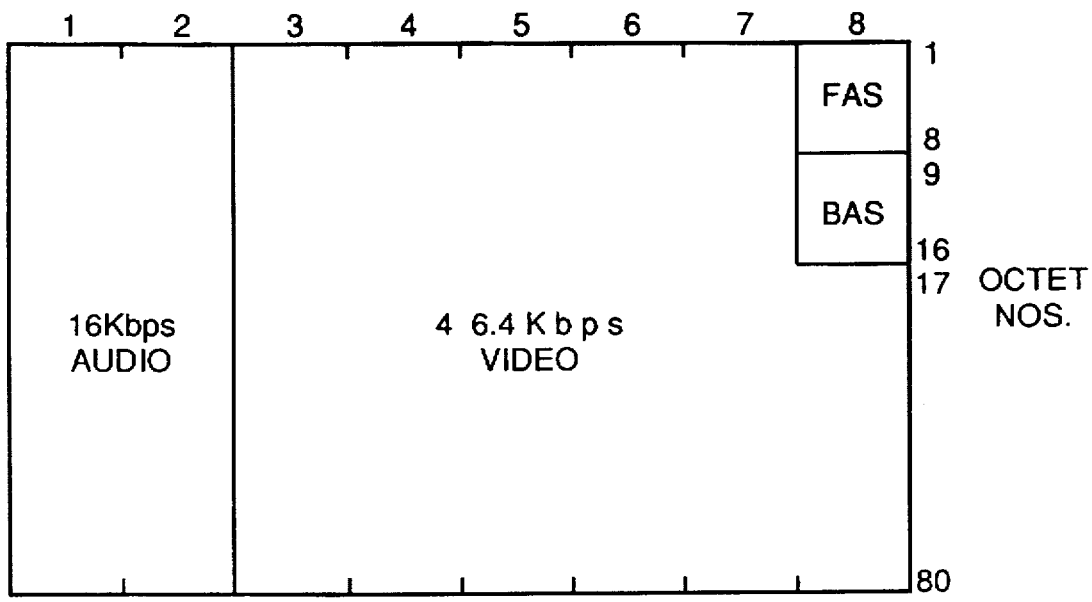
FIGS. 12(A) and 12(B) illustrate frame structures defined in CCITT recommendation H. 221, which are used by the multimedia communication apparatus according to the fifth embodiment of the present invention.

FIG. 12(A) illustrates the H. 221 frame structure employed in this multimedia communication mode. 16 kbps of the 64 kbps of the B channel and 46.4 kbps thereof are used for audio communication and video communication, respectively.

Figure 13:
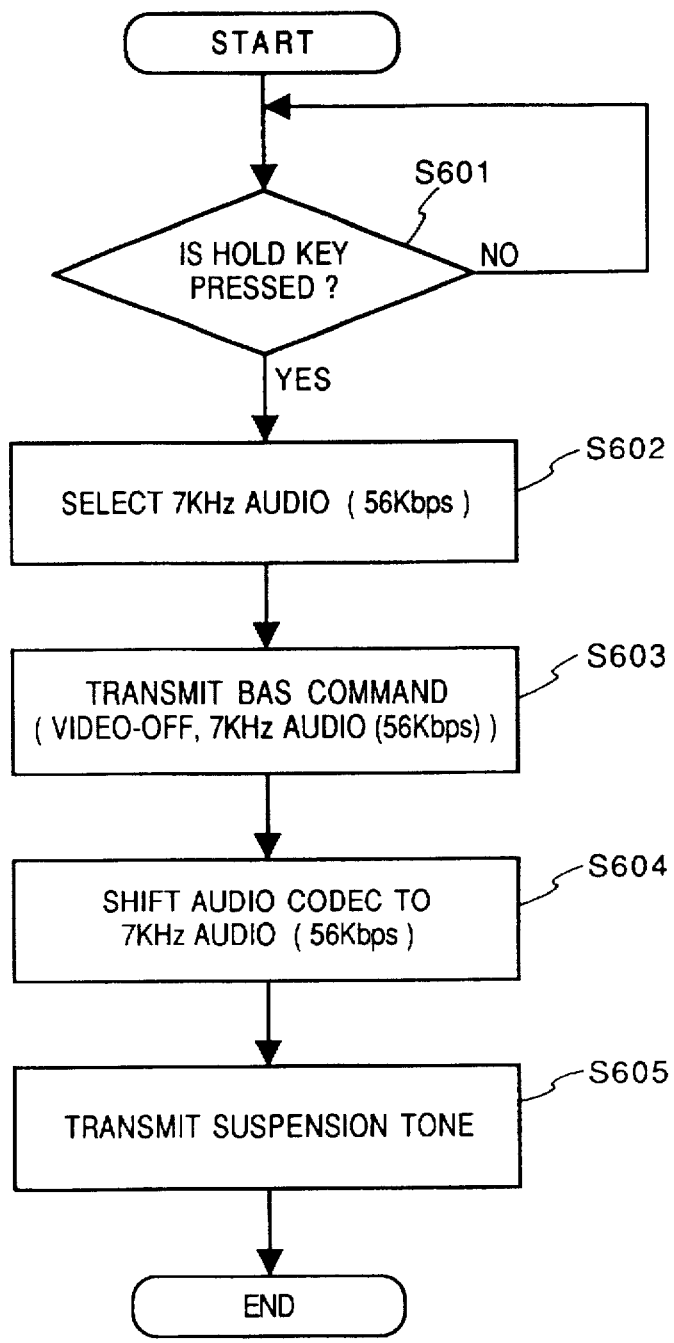
FIG. 13 is the flowchart of the suspension setting operation of the multimedia communication apparatus according to the fifth embodiment of the present invention.

A communication suspension is performed following the flowchart shown in FIG. 13. In Step S601, the system control unit 14 of the terminal X monitors whether or not the hold key 13a has been pressed. If the hold key 13a has been pressed, the operation proceeds to Step S602, where the system control unit 14 selects the 7 KHz audio (56 kbps), that is, an audio coding mode employed to transmit audio signals but not image signals. In Step S603, a BAS command is outputted in order to designate the 7 KHz audio (56 kbps) and the video-off, as shown in P304 in FIG. 11. In Step S604, the switches 52g and 52h of the coding portion 52 of the terminal X are shifted to select the 7 KHz audio codec 52c, thus enabling the 7 KHz audio (56 kbps) coding mode. When the terminal Y receives the BAS command, the switches 53g and 53h of the decoding portion 53 of the terminal Y are shifted to select the 7 KHz audio codec 53c. In Step S605, a suspension tone is outputted.

Figure 12B:
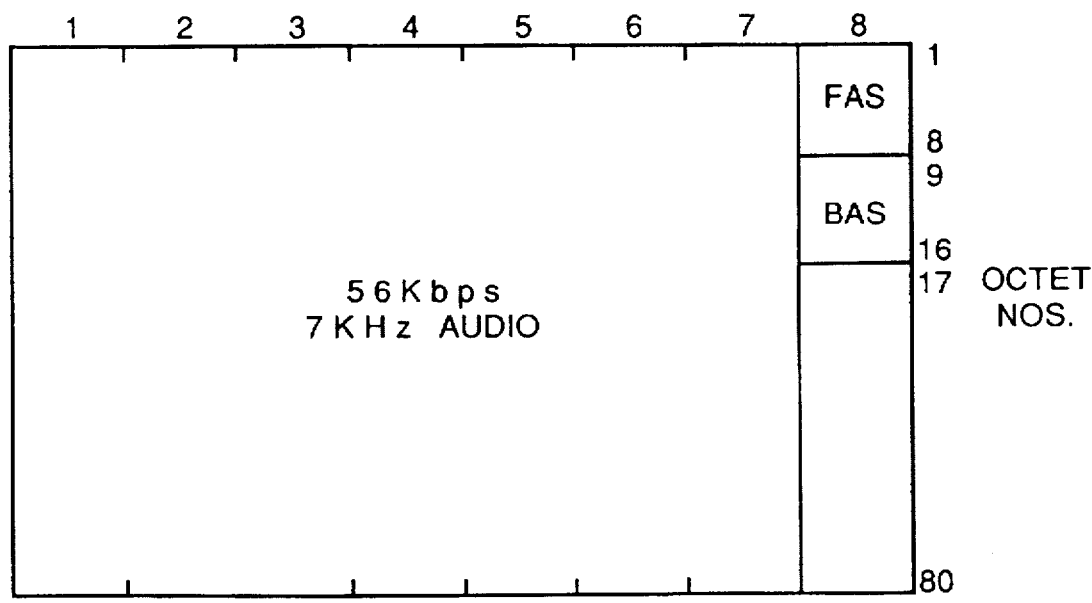

As described above, during the multimedia communication P304 as shown in FIG. 11, the terminal X transmits a suspension tone to the terminal Y by the 7 KHz audio. The structure of the H. 221 frame for this multimedia communication is illustrated in FIG. 12(B). 56 kbps of the 64 kbps of the B channel is used for the 7 KHz audio.

Figure 14:
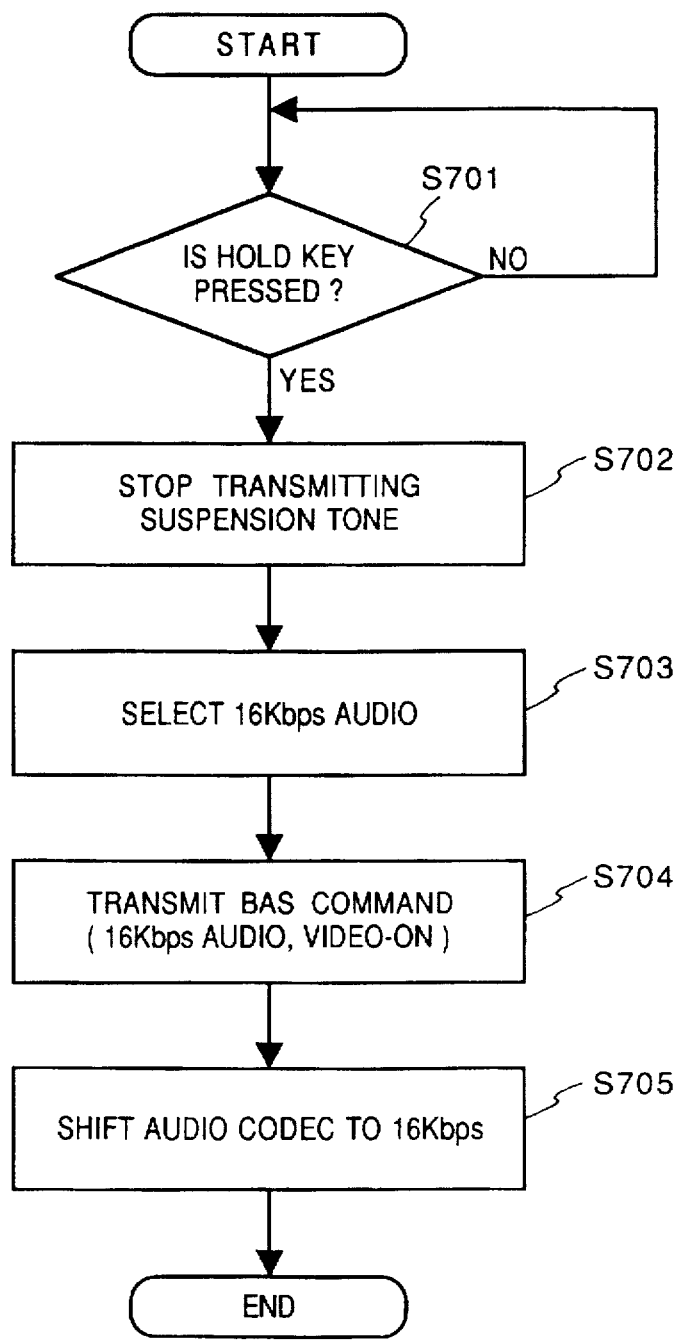
FIG. 14 is the flowchart of the suspension canceling operation of the multimedia communication apparatus according to the fifth embodiment of the present invention.

Cancellation of a communication suspension is performed following the flowchart shown in FIG. 14. In Step S701, the system control unit 14 of the terminal X monitors whether or not the hold key 13a has been pressed during a communication suspension. If the hold key 13a has been pressed, the operation proceeds to Step S702, where transmission of the suspension tone is stopped. In Step S703, the system control unit 14 selects the 16 kbps audio, that is, an audio coding mode employed to transmit image signals as well as audio signals. In Step S704, a BAS command is outputted in order to designate the 16 kbps audio and the video-on, as indicated in P307 in FIG. 11. In Step S705, the switches 52g and 52h in the coding portion 52 are shifted to select the 16 kbps APC-AB codec 52e, thus enabling the 16 kbps audio coding mode. When the terminal Y receives the BAS command as indicated in P307 in FIG. 11, the switches 53g and 53h of the decoding portion 53 of the terminal Y are shifted to select the 16 kbps APC-AB codec 53e.

Thus, the communication mode of the multimedia communication of P308 shown in FIG. 11 becomes the same as in the multimedia communication of P304, which mode is a normal communication mode.

A multimedia communication apparatus according to a sixth embodiment of the present invention will be described.

This embodiment is constructed as shown in FIG. 9. In other words, it is constructed in substantially the same manner as the fifth embodiment. However, according to the sixth embodiment, a transmission capacity allocated for image transmission is used to transmit a suspension message when multimedia communication is suspended.

Figure 15:
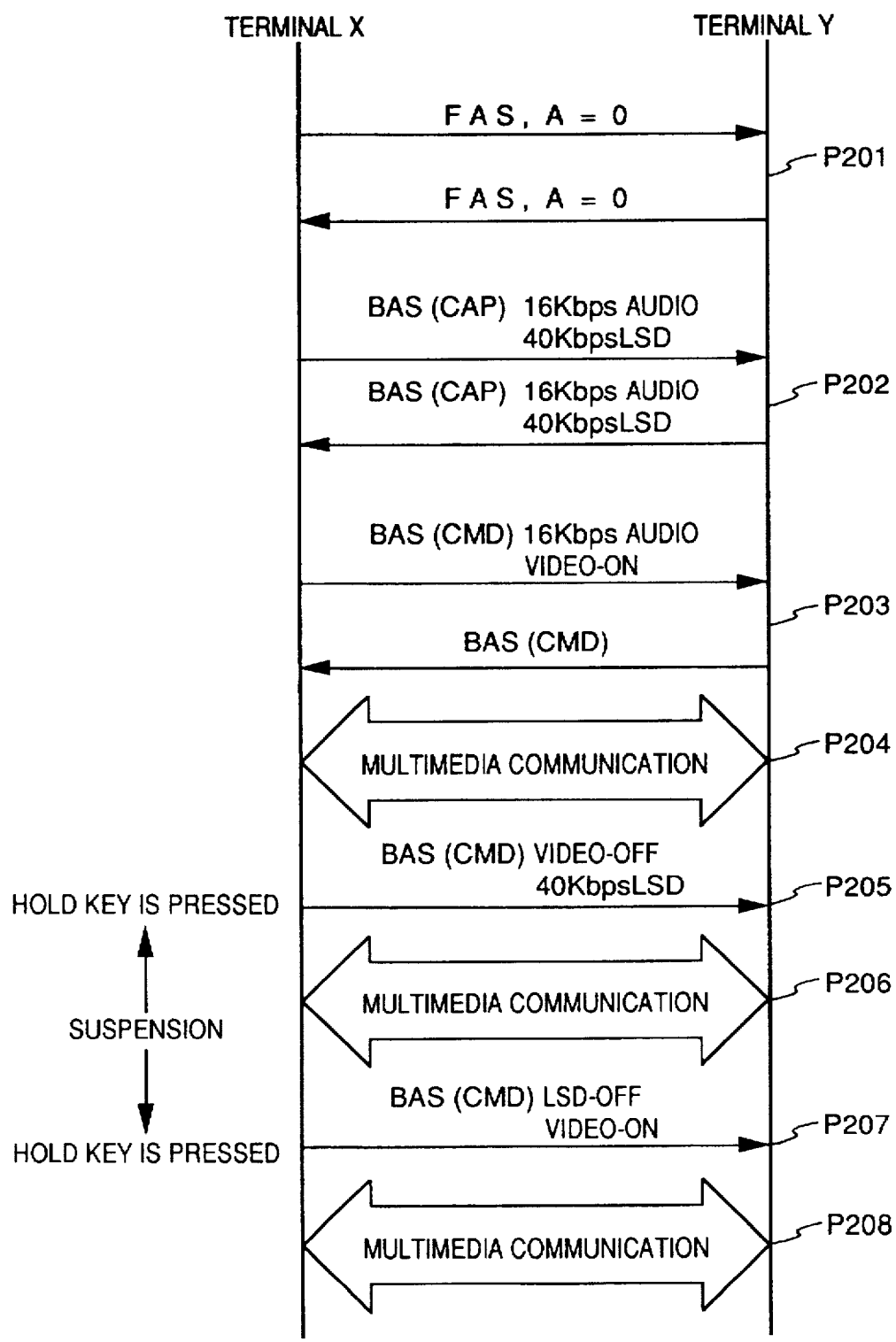
FIG. 15 illustrates the procedure of multimedia communication of the multimedia communication apparatus according to a sixth embodiment of the present invention.
Figure 16A:
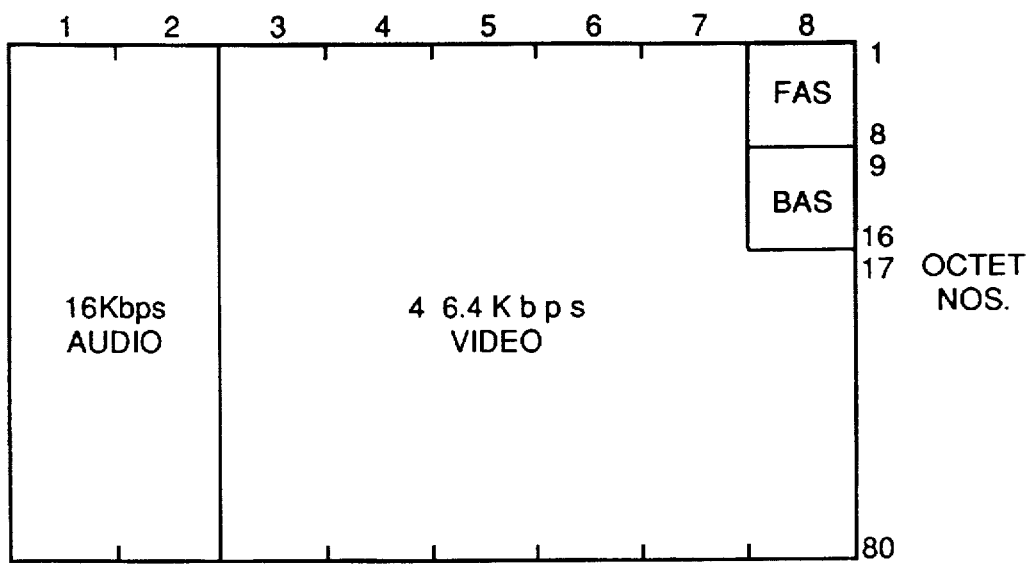
FIGS. 16(A) and 16(B) illustrate frame structures defined in CCITT recommendation H. 221, which are used by the multimedia communication apparatus according to the sixth embodiment of the present invention.

FIG. 15 shows the procedure sequence on a B channel during multimedia communication according to the sixth embodiment of the present invention. After an end-to-end connection is determined on a D channel, H. 221 frame synchronization is performed using FAS (P201). After frame synchronization (P201), H. 242 ability exchange is preformed using ability BAS codes (P202), which exchanges, for example: audio abilities and data abilities, such as 16 kbps audio and 40 kbps low-speed data (LSD), except for both A-Law audio and μ-Law audio; transmission rate abilities such as a 1B channel; and video abilities. After ability exchange (P202), H. 242 mode shift is performed using BAS commands (P203) in order to select a communication mode within the range of ability enabling communication. In the process P203, the system control unit 14 selects an audio coding mode in accordance with the transmission speed of a currently available communication path. For example, if 16 kbps audio and 46.4 kbps video are used for the 64 kbps B channel communication, mode shifts, such as shifts to the 16 kbps audio and to the video-on, are designated in the H. 242 mode shift process P203. Then, multimedia communication is performed (P204). FIG. 16(A) illustrates the structure of the H. 221 frame employed in this multimedia communication mode. 16 kbps of the 64 kbps of the B channel and 46.4 kbps thereof are used for audio communication and video communication, respectively.

Figure 17:
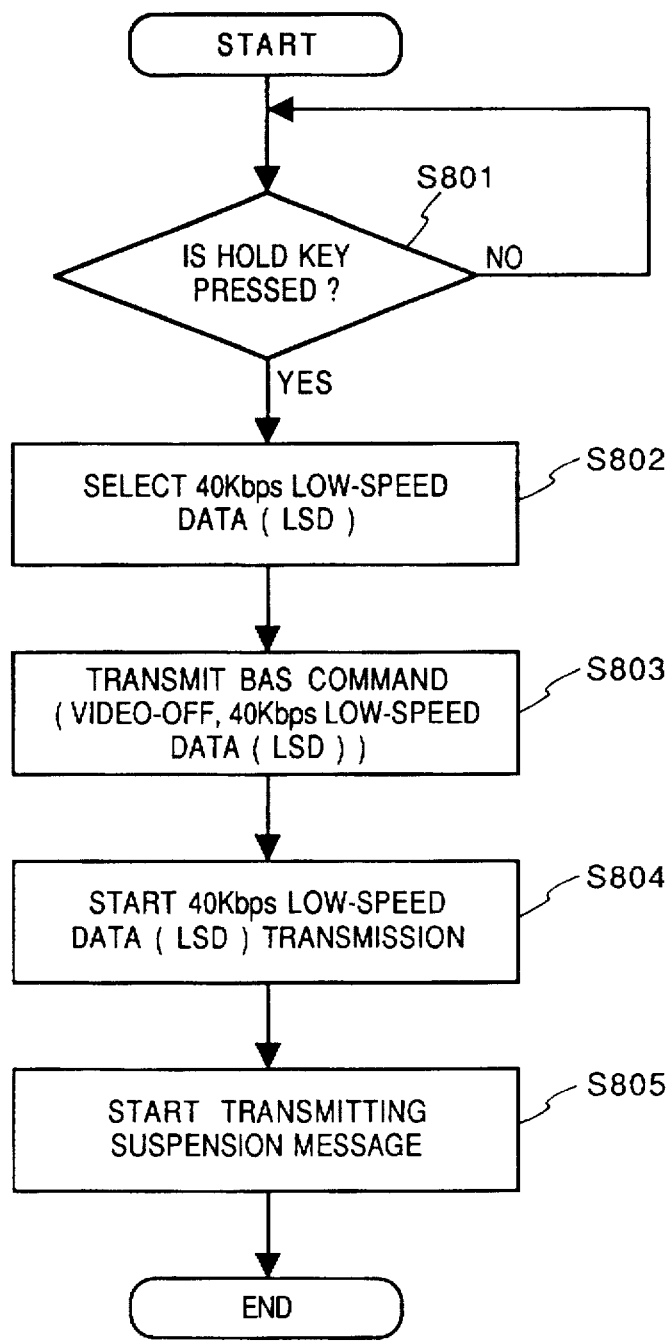
FIG. 17 is the flowchart of the suspension setting operation of the multimedia communication apparatus according to the sixth embodiment of the present invention.

A suspension message is transmitted by a terminal X (a first multimedia communication apparatus) following the flowchart shown in FIG. 17. In Step S801, the system control unit 14 of the terminal X monitors whether or not the hold key 13a has been pressed. If the hold key 13a has been pressed, the operation proceeds to Step S802, where the system control unit 14 selects the 40 kbps low-speed data (LSD), the speed being a data transmission speed employed to transmit audio signals but not image signals. In Step S803, a BAS command is outputted in order to designate the 40 kbps low-speed data (LSD) and the video-off, as indicated in P204 in FIG. 15. Then, in Step S804, transmission by the 40 kbps low-speed data (LSD) is performed using the data interface unit 12. In Step S805, a suspension message stored by the 40 kbps low-speed data (LSD) beforehand is transmitted.

Figure 18:
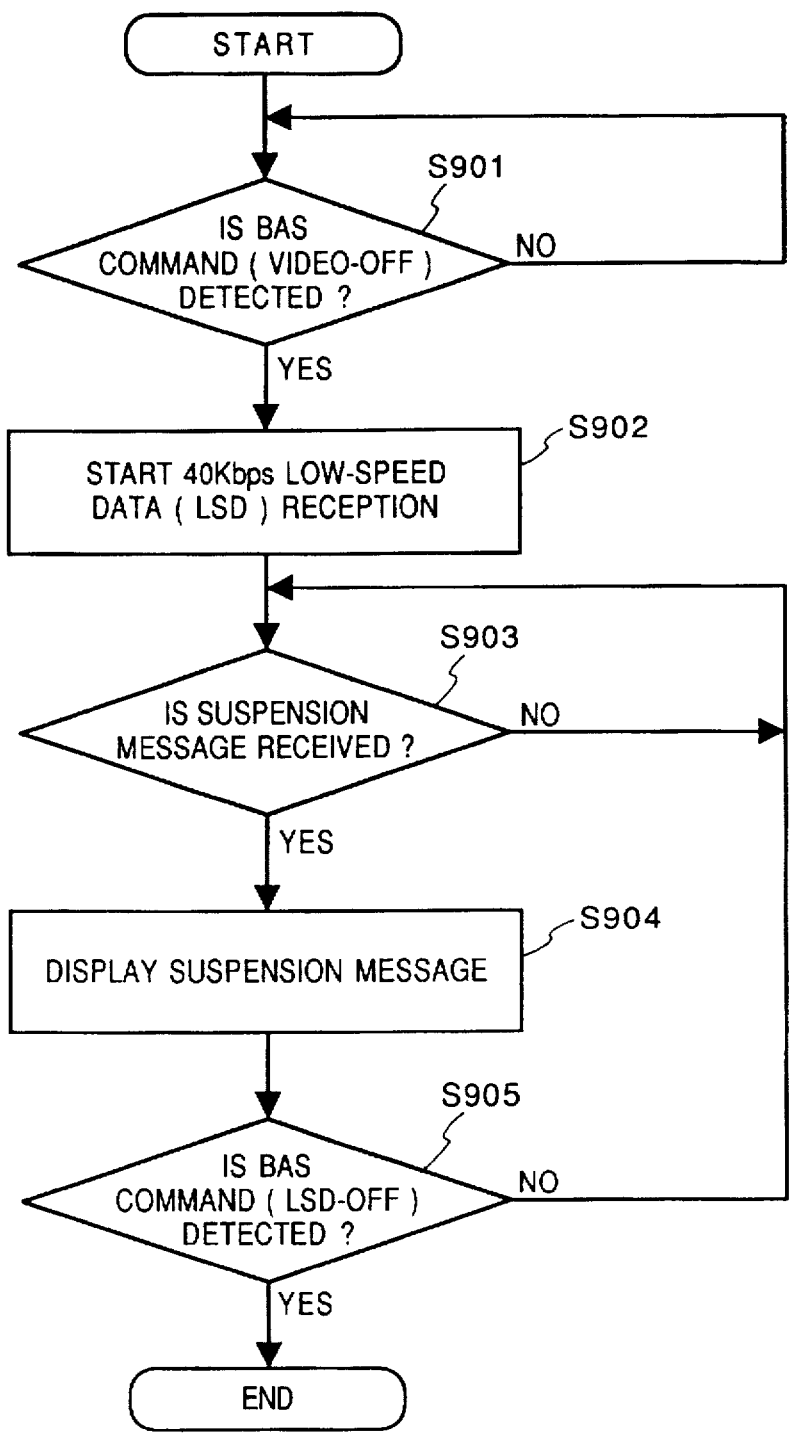
FIG. 18 is the flowchart of the suspension-signal reception of the multimedia communication apparatus according to the sixth embodiment of the present invention.

A suspension message is received by a terminal Y (a second multimedia communication apparatus) following the flowchart shown in FIG. 18. In Step S901, the system control unit 14 of the terminal Y monitors whether or not a BAS command designating the video-off has been received. If a BAS command designating the video-off as indicated in P205 in FIG. 15 has been received (or detected), the operation proceeds to Step S902. In Step S902, reception of the 40 kbps low-speed data (LSD) designated by the BAS command is started using the data interface unit 12. Then, if it is observed that the suspension message carried by the 40 kbps low-speed data (LSD) has been received in Step S903, the suspension message received is displayed in the display unit 8 in Step S904. The process of receiving and displaying the suspension message (Step S903 and Step S904) is repeated until a BAS command designating cancellation of reception of the low-speed data (LSD) (LSD-off) is detected in Step S905.

Figure 16B:
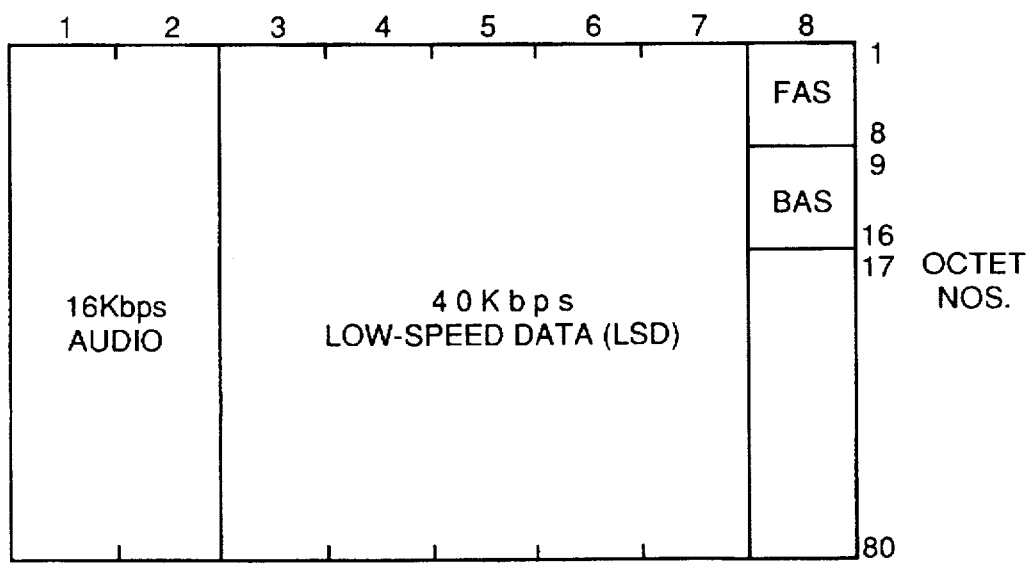

As described above, during multimedia communication P206 as shown in FIG. 15, the terminal X transmits to the terminal Y sounds by the 16 kbps audio and a suspension message by the 40 kbps low-speed data (LSD), as shown in FIG. 16(B) illustrating the structure of the H. 221 frame. 16 kbps and 40 kbps of the 64 kbps of the B channel are used for audio transmission and low-speed data (LSD) transmission, respectively.

Figure 19:
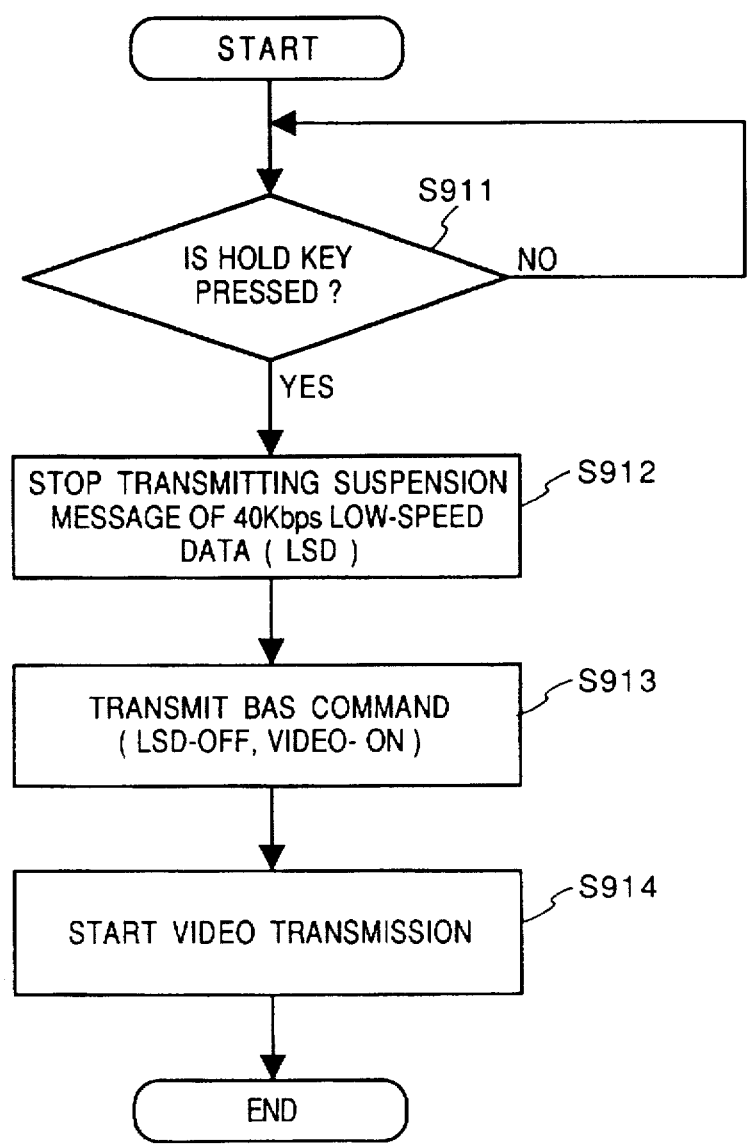
FIG. 19 is the flowchart of the suspension canceling operation of the multimedia communication apparatus according to the sixth embodiment of the present invention.

The terminal X cancels a communication suspension, following the flowchart shown in FIG. 19. In Step S911, the system control unit 14 of the terminal X monitors whether or not the hold-key 13a has been pressed during a communication suspension. If it has been pressed, the operation proceeds to Step 912, where transmission of the suspension message by the 40 kbps low-speed data (LSD) is stopped. In Step S913, a BAS command designating the video-on and cancellation of transmission of the low-speed data (LSD) (LSD-off) is transmitted as shown in P207 in FIG. 15. Then, in Step S914, video transmission at 46.4 kbps using the video interface unit 9 is performed.

Figure 20:
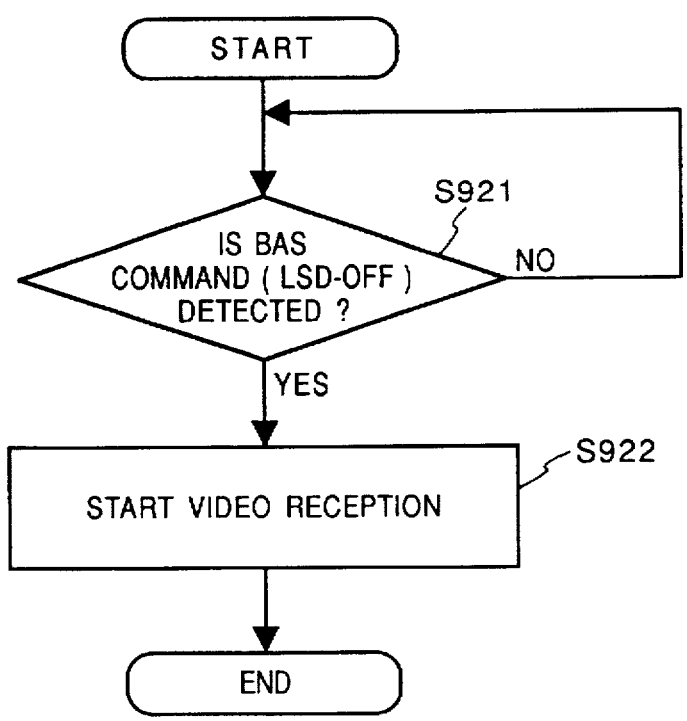
FIG. 20 is another flowchart of the suspension canceling operation of the multimedia communication apparatus according to the sixth embodiment of the present invention.

On the other hand, the terminal Y follows the flowchart shown in FIG. 20. In Step S921, the system control unit 14 monitors whether or not a BAS command designating cancellation of the low-speed data (LSD) is received. If a BAS command designating cancellation of the low-speed data (LSD) is received (or detected), the operation proceeds to Step S922, where reception of video signals is restarted in response to the video-on designated by the BAS command.

Thus, multimedia communication P208 as shown in FIG. 15 is performed in the same mode as the mode of multimedia communication P204, which mode is a normal communication mode.

Although the above-described embodiments each use one B channel (64 kbps) of the ISDN, the present invention can be applied to a multimedia communication apparatus using two B channels (128 kbps) as the basic interface or a primary-group interface.

Further, although the above embodiments employ the 16 kbps APC-AB and 7 KHz audio (56 kbps) as the audio coding modes, other audio coding modes can be employed.

Still further, if data transmission is performed along with audio and visual transmission, the correlation between the audio transmission speed and the video transmission speed is basically the same as in the above-described embodiments.

Further, although the sixth embodiment uses the 40 kbps low-speed data (LSD), other data transmission speeds may be used instead.

As described above, because a multimedia communication apparatus according to the fifth embodiment comprises: selecting means for selecting a predetermined audio coding mode in accordance with the transmission speed of a currently available communication path when transmission of image information is stopped during a communication suspension; and audio shifting means for shifting the audio coding process to said audio coding mode selected by said selection means, a transmission capacity allocated for visual transmission during a normal communication is used for audio transmission during a communication suspension. Therefore, the overall transmission capacity can be further utilized, and a high-quality suspension tone can be provided, thus facilitating operation of the user.

Further, because a multimedia communication apparatus according to one aspect of the sixth embodiment comprises: selecting means for selecting a predetermined data transmission speed in accordance with the transmission speed of a currently available communication path when transmission of image information is stopped during a communication suspension; and transmission means for transmitting a suspension message stored beforehand, at the data transmission speed selected by the selecting means, a transmission capacity allocated for visual transmission can be used for transmission of the suspension message during a suspension, thus achieving the same advantages as achieved by the fifth embodiment.

Still further, because a multimedia communication apparatus according to another aspect of the sixth embodiment comprises: detection means for detecting an image-information transmission suspending command which is transmitted by a communication-partner terminal; reception means for receiving a suspension message transmitted by the communication-partner terminal when the detection means detects an image-information transmission suspending command; and display means for displaying the suspension message received by the reception means, the apparatus can display an image indicating that communication is suspended, thus achieving the above-described advantages.

While the present invention has been described with reference to what are presently considered to be the preferred embodiments, it is to be understood that the invention is not limited to disclosed embodiments. To the contrary, the invention is intended to cover various modifications and equivalent arrangements included within the spirit and scope of the appended claims.

What is claimed is:

1. A method of suspending communication conducted by a multimedia communication system for communicating multimedia information including image information through a communication line, comprising:

a first step of selecting a communication suspension at a first multimedia communication apparatus when said first multimedia communication apparatus is communicating with a second multimedia communication apparatus;

a second step of suspending transmission of image information at said first multimedia communication apparatus after transmitting a suspension command from said first multimedia communication apparatus to said second multimedia communication apparatus when the communication suspension is selected at said first step; and a third step in which, in response to the suspension command received from said first multimedia communication apparatus, said second multimedia communication apparatus freezes image information received from said first multimedia communication apparatus, stores the frozen image information into a memory of said second multimedia communication apparatus, and then displays the frozen image information out of the memory as a frozen image on a display of said second multimedia communication apparatus.

2. A method of suspending communication conducted by a multimedia communication system for communicating multimedia information including image information through a communication line, comprising:

first step of selecting a communication suspension at a first multimedia communication apparatus when said first multimedia communication apparatus is communicating with a second multimedia communication apparatus;

a second step of suspending transmission of image information after freezing said image information in said first multimedia communication apparatus and keeping the frozen image information from said first multimedia communication apparatus to transmit to said second multimedia communication apparatus when the communication suspension is selected at said first step; and a third step in which said second multimedia communication apparatus receives said frozen image information transmitted from said first multimedia communication apparatus and displays an image by using the received frozen image information;

wherein said second multimedia communication apparatus displays the frozen image by displaying the image sent from the first multimedia communication apparatus even if the second multimedia communication apparatus does not have a structure to generate the frozen image.

3. A multimedia communication system for communicating multiplexed multimedia information including audio information and image information, through a communication line, comprising a first communication apparatus and a second communication apparatus, said first communication apparatus comprising:
operation means for operating to suspend transmission of image information during communication with said second communication apparatus; and
transmission means for transmitting a suspension command to said second communication apparatus in response to operation of said operation means, said second communication apparatus comprising:
reception means for receiving the suspension command from the transmission means of said first communication apparatus;
control means for controlling freezing of image information received from said first communication apparatus, in response to said suspension command;
storage means for storing the frozen image information automatically in a memory when the suspension command is received from said first communication apparatus; and
display means for displaying a frozen image by using the frozen image information stored in said storage means.

4. A multimedia communication system for communicating multiplexed multimedia information including audio information and image information, through a communication line, comprising a first communication apparatus and a second communication apparatus, said first communication apparatus comprising:
operation means for operating to suspend transmission of image information during communication with said second communication apparatus;
control means for controlling freezing of to-be-transmitted image information in response to suspension of the transmission by said operation means;
storage means for storing the image information frozen under the control of said control means; and
transmission means for keeping the frozen image information stored in said storage means to transmit the frozen image information to said second communication apparatus, said second communication apparatus comprising:
reception means for receiving the frozen image information from the transmission means of the first communication apparatus; and
display means for displaying an image using the frozen image information received by said reception means;

wherein said second communication apparatus displays the frozen image by displaying the image sent from the first communication apparatus even if the second communication apparatus does not have a structure to generate the frozen image.

5. A multimedia communication system for communicating multiplexed multimedia information including audio information and image information, through a communication line, comprising a first and a second communication apparatuses, said first communication apparatus comprising:
operation means for operating to suspend transmission of image information during communication with said second communication apparatus; and
transmission means for transmitting a suspension command to said second communication apparatus in response to operation of said operation means, said second communication apparatus comprising:
reception means for receiving the suspension command from the transmission means of the first communication apparatus;
storage means for storing a suspension image before starting communication with the first communication apparatus; and
display means for displaying the suspension image stored in said storage means when said reception means has received a suspension command.

6. A multimedia communication system for communicating multiplexed multimedia information including audio information and image information, through a communication line, comprising a first communication apparatus and a second communication apparatus, said first communication apparatus comprising:
operation means for operating to suspend transmission of image information during communication with said second communication apparatus;
storage means for storing a suspension image before starting communication with said second communication apparatus; and
transmission means for transmitting the suspension image stored in said storage means in response to suspension of the transmission by said operation means, said second communication apparatus comprising:
reception means for receiving the suspension image transmitted from the transmission means of the first communication apparatus; and
display means for displaying an image by using the suspension image received by said reception means;

wherein said second multimedia communication apparatus displays the frozen image by displaying the image sent from the first multimedia communication apparatus even if the second communication apparatus does not have a structure to generate the frozen image.

7. A multimedia communication system for performing communication by using media at least including sounds and images, comprising:

selecting means for selecting a predetermined data transmission speed different from a transmission speed of image information in accordance with a transmission speed of a currently available communication path when transmission of image information is stopped during a communication suspension; and transmission means for transmitting a suspension message as data information, at the predetermined data transmission speed selected by said selecting means;

wherein, when transmission of image information is stopped, said selecting means selects a transmission speed of data information so that a communication frame of the image information is allocated to a communication frame of the data information, and wherein said transmission means transmits the suspension message as the data information by using the communication frame of the image information.

* * * * *